(No Model.)

D. F. BREMNER.
Molding Bread.

No. 234,166.  Patented Nov. 9, 1880.

WITNESSES
James H. Coyne
Charles H. Schoff

INVENTOR
David F. Bremner
By Coyne and Elliott
Attorneys.

N. PETERS, PHOTO-LITHOGRAPHER, WASHINGTON, D C.

UNITED STATES PATENT OFFICE.

DAVID F. BREMNER, OF CHICAGO, ILLINOIS.

MOLDING BREAD.

SPECIFICATION forming part of Letters Patent No. 234,166, dated November 9, 1880.

Application filed September 13, 1880. (No model.)

*To all whom it may concern:*

Be it known that I, DAVID F. BREMNER, a citizen of the United States, residing in Chicago, in the county of Cook and State of Illinois, have invented a new and useful Process for Forming Loaves of Bread, of which the following is a specification.

My invention relates to improvements in the process for forming loaves of bread from slabs of dough of the desired dimensions; and the objects of my improvements are, first, to prevent the escape of the panary gases, so that the loaf will be plump and its top present a rounding contour; second, to have the baked loaf retain its moisture, and thereby prevent the too rapid drying thereof; and, finally, to dispense with the necessity of skilled labor for forming loaves of bread. I attain these objects by forming the loaves as indicated in the several figures of the drawings, in which—

Figure 1:
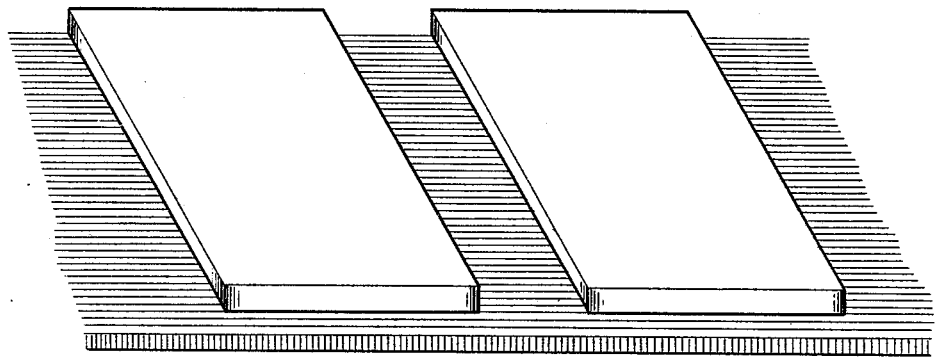
Figures 2, 3:
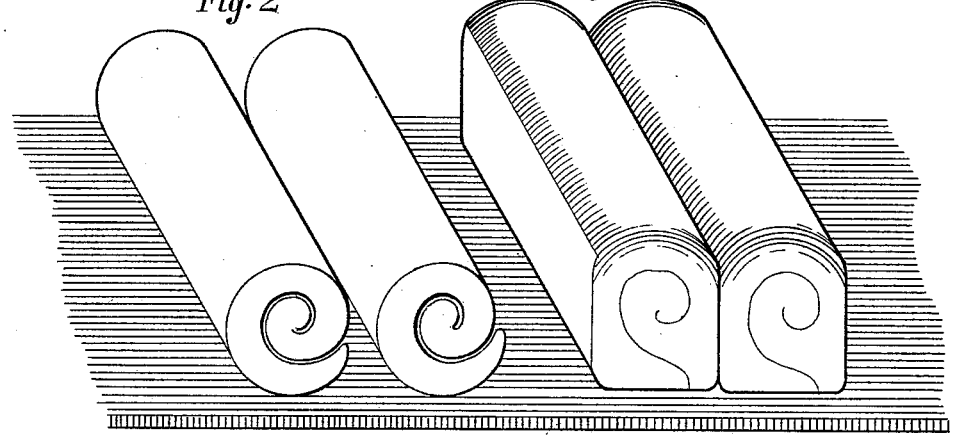
Figure 4:
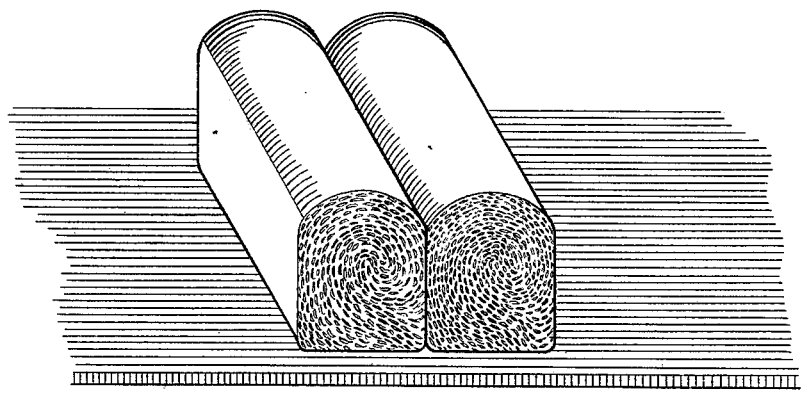

Figure 1 represents several slabs of dough of dimensions necessary for as many loaves of bread of a given size; Fig. 2, a perspective of the dough after it is prepared for the pans; Fig. 3, a similar view of the baked loaf; and Fig. 4, a cross-section of the same, showing the formation of the grain.

To carry my process into effect the dough is thoroughly kneaded and rolled out, by machinery or other suitable means, into sheets of the desired thickness, and then divided into slabs, as shown in Fig. 1. The slabs thus formed are taken by one of their side edges and rolled so that the dough will be wound spirally about itself, as shown in Fig. 2, in which condition the roll or loaf is placed in the baking-pan with the outer side edge of the slab resting on the bottom of the pan, and then subjected to an ordinary oven for baking.

The effect of rolling the dough in this manner is to give the loaf a spiral grain, commencing at its center of diameter and terminating at the bottom of the loaf, where the pores of the grain are substantially sealed or closed by reason of the pressure of the dough above before the loaf is baked. This spiral formation of the grain and the closing of the pores of its outer end serves to prevent not only the escape during the baking of the panary gases, which are instrumental in causing the dough to rise and give plumpness to the loaf, but also prevent the escape of the moisture retained by the baked loaf, so that the loaf may be kept fresh much longer than when formed in the ordinary manner.

Furthermore, the grain of the bread is much whiter and the crust more evenly browned than if the slabs were simply folded, as has been heretofore.

As little or no skill is required to form these loaves from the slabs, I may dispense with skilled and costly labor and employ boys or girls to roll the slabs and place them in the pans, the result of which is that I am enabled to produce an extra fine quality of bread at a reduced cost.

What I claim, and desire to secure by Letters Patent, is—

The mode of forming loaves of bread which consists in subjecting a flat slab of dough to a winding process, so that the grain of the baked loaf will have substantially a spiral form, beginning with its center and terminating upon its outer face.

DAVID F. BREMNER.

Witnesses:
JNO. G. ELLIOTT,
JAMES H. COYNE.